United States Patent
Green et al.

(10) Patent No.: US 12,353,978 B2
(45) Date of Patent: Jul. 8, 2025

(54) SYSTEM FOR AND METHOD OF DATA ENCODING AND/OR DECODING USING NEURAL NETWORKS

(71) Applicant: Hitachi Rail GTS Canada Inc., Toronto (CA)

(72) Inventors: Alon Green, Toronto (CA); Dennis Yazhemsky, Toronto (CA)

(73) Assignee: Hitachi Rail GTS Canada Inc., Toronto (CA)

( * ) Notice: Subject to any disclaimer, the term of this patent is extended or adjusted under 35 U.S.C. 154(b) by 1033 days.

(21) Appl. No.: 16/430,194

(22) Filed: Jun. 3, 2019

(65) Prior Publication Data
US 2019/0370638 A1   Dec. 5, 2019

Related U.S. Application Data

(60) Provisional application No. 62/679,508, filed on Jun. 1, 2018.

(51) Int. Cl.
*G06N 3/045* (2023.01)
*G06N 3/08* (2023.01)

(52) U.S. Cl.
CPC .............. *G06N 3/045* (2023.01); *G06N 3/08* (2013.01)

(58) Field of Classification Search
CPC ........ G06N 3/0454; G06N 3/006; G06N 3/08; G06N 7/005; G06N 3/084; H04N 19/46
See application file for complete search history.

(56) References Cited

U.S. PATENT DOCUMENTS

| | | | |
|---|---|---|---|
| 9,740,944 B2 | 8/2017 | Micks et al. | |
| 9,884,623 B2 | 2/2018 | Fasola et al. | |
| 9,892,301 B1 | 2/2018 | Holub et al. | |
| 10,209,081 B2 | 2/2019 | Ghadiok et al. | |
| 10,248,124 B2 * | 4/2019 | Bellaiche | G01S 13/931 |
| 11,537,134 B1 * | 12/2022 | Wiest | G05D 1/0221 |

(Continued)

FOREIGN PATENT DOCUMENTS

| | | |
|---|---|---|
| CN | 108416428 A | 8/2018 |
| WO | 2016139580 A1 | 9/2016 |

(Continued)

OTHER PUBLICATIONS

Manz, M. et al., "Monocular Model-Based 3D Vehicle Tracking for Autonomous Vehicles in Unstructured Environment" (Year: 2011).*

(Continued)

*Primary Examiner* — Alexey Shmatov
*Assistant Examiner* — Devika S Maharaj
(74) *Attorney, Agent, or Firm* — Studebaker Brackett PLLC

(57) ABSTRACT

A system includes a neural network encoder, an environmental filter and a neural network decoder. The neural network encoder is configured to generate encoded data from input data. The environmental filter is communicably connected with the encoder and configured to combine the encoded data with at least one randomized image to generate signature data corresponding to the input data. The neural network decoder is configured to be trained together with the encoder and the environmental filter to decode the signature data to generate decoded data corresponding to the input data.

20 Claims, 5 Drawing Sheets

(56) References Cited

U.S. PATENT DOCUMENTS

| | | | | |
|---|---|---|---|---|
| 2001/0016051 | A1* | 8/2001 | Rhoads | H04N 21/23892 |
| | | | | 707/E17.112 |
| 2017/0031369 | A1* | 2/2017 | Liu | G01C 21/206 |
| 2017/0249745 | A1 | 8/2017 | Fiala | |
| 2018/0120843 | A1* | 5/2018 | Berntorp | G06N 3/08 |
| 2018/0276847 | A1* | 9/2018 | Last | G06V 10/52 |
| 2019/0026870 | A1* | 1/2019 | Hu | G06T 5/005 |
| 2019/0049583 | A1* | 2/2019 | Xu | G01S 17/931 |
| 2019/0178991 | A1* | 6/2019 | Hall | G01S 17/42 |
| 2019/0205667 | A1* | 7/2019 | Avidan | G06F 18/28 |
| 2019/0213426 | A1* | 7/2019 | Chen | G06V 20/588 |
| 2019/0244329 | A1* | 8/2019 | Li | G06N 3/088 |

FOREIGN PATENT DOCUMENTS

| | | |
|---|---|---|
| WO | WO2017209660 A1 | 12/2017 |
| WO | 2018084324 A1 | 5/2018 |

OTHER PUBLICATIONS

Assidiq, A AM. et al., "Real Time Lane Detection for Autonomous Vehicles" (Year: 2008).*

Tian, Y. et al., "Deep Test: Automated Testing of Deep-Neural-Network-driven Autonomous Cars" (Year: 2018).*

Tian, Y. et al., "Deep Test: Automated Testing of Deep-Neural-Network-driven Autonomous Cars", https://arxiv.org/abs/1708.08559 (Year: 2018).*

Wheeler, T. et al., "Deep Stochastic Radar Models", https://arxiv.org/abs/1701.09180 (Year: 2017).*

Brabandere, B. et al., "Dynamic Filter Networks", https://arxiv.org/abs/1605.09673 (Year: 2016).*

Oh, J. et al., "Action-Conditional Video Prediction using Deep Networks in Atari Games", https://arxiv.org/abs/1507.08750 (Year: 2015).*

Worrall, D. et al., "Interpretable Transformations with Encoder-Decoder Networks", https://arxiv.org/abs/1710.07307 (Year: 2017).*

Tian, Y. et al., "DeepTest: Automated Testing of Deep-Neural-Network-driven Autonomous Cars", https://arxiv.org/abs/1708.08559, Mar. 20, 2018 (Year: 2018).*

Huang, X. et al., "Arbitrary Style Transfer in Real-time with Adaptive Instance Normalization", https://arxiv.org/abs/1703.06868 (Year: 2017).*

Grinchuk, Oleg et al., "Learnable visual markers", In Advances in Neural Information Processing Systems, pp. 4143-4151, 2016, Retrieved at https://papers.nips.cc/paper/6323-learnable-visual-markers.pdf.

Bhatnagar, Ishan et al., "QR code denoising using parallel Hopfield networks", arXiv preprint arXiv:1812.01065 (2018), Retrieved at https://arxiv.org/ftp/arxiv/papers/1812/1812.01065.pdf.

Grósz, Tamas et al., "QR code localization using deep neural networks", IEEE International Workshop on Machine Learning for Signal Processing (MLSP), pp. 1-6, IEEE, 2014, Retrieved at http://www.inf.u-szeged.hu/~groszt/pubs/mlsp2014.pdf.

Garrido-Jurado, Sergio et al., "Automatic generation and detection of highly reliable fiducial markers under occlusion", Pattern Recognition 47, No. 6 (2014): 2280-2292, Retrieved at http://cs-courses.mines.edu/csci507/schedule/24/ArUco.pdf.

Rumpler, Markus et al., "Automated end-to-end workflow for precise and geo-accurate reconstructions using fiducial markers", ISPRS Annals of Photogrammetry, Remote Sensing and Spatial Information Sciences 3 (2014): 135-142, Retrieved at https://www.ri.cmu.edu/pub_files/2014/9/rumpler_pcv2014.pdf.

Chen et al., Tianbiao, "Pedestrian detection in infrared image using HOG and Autoencoder," Procedings of SPIE, vol. 10605, Nov. 15, 2017, pp. 106053Q-106053Q.

Ding et al., Jun, "Convolutional Neural Network With Data Augmentation for SAR Target Recognition," IEEE Geoscience and Remote Sensing Letters, vol. 13, No. 3, Mar. 1, 2016, pp. 364-368.

Nguyen et al., Anh, "Plug & Play Generative Networks: Conditional Iterative Generation of Images in Latent Space," 2017 IEEE Conference on Computer Vision and Pattern Recognition (CVPR), IEEE Computer Society, US, Jul. 21, 2017, pp. 3510-3520.

Extended European Search Report issued in corresponding European Application No. 19811965.3, mailed Jul. 4, 2022, pp. 1-13, European Patent Office, Munich, Germany.

International Search Report and Written Opinion issued in corresponding International Application No. PCT/IB2019/054595, mailed Sep. 25, 2019, pp. 1-8, Quebec, Canada.

* cited by examiner

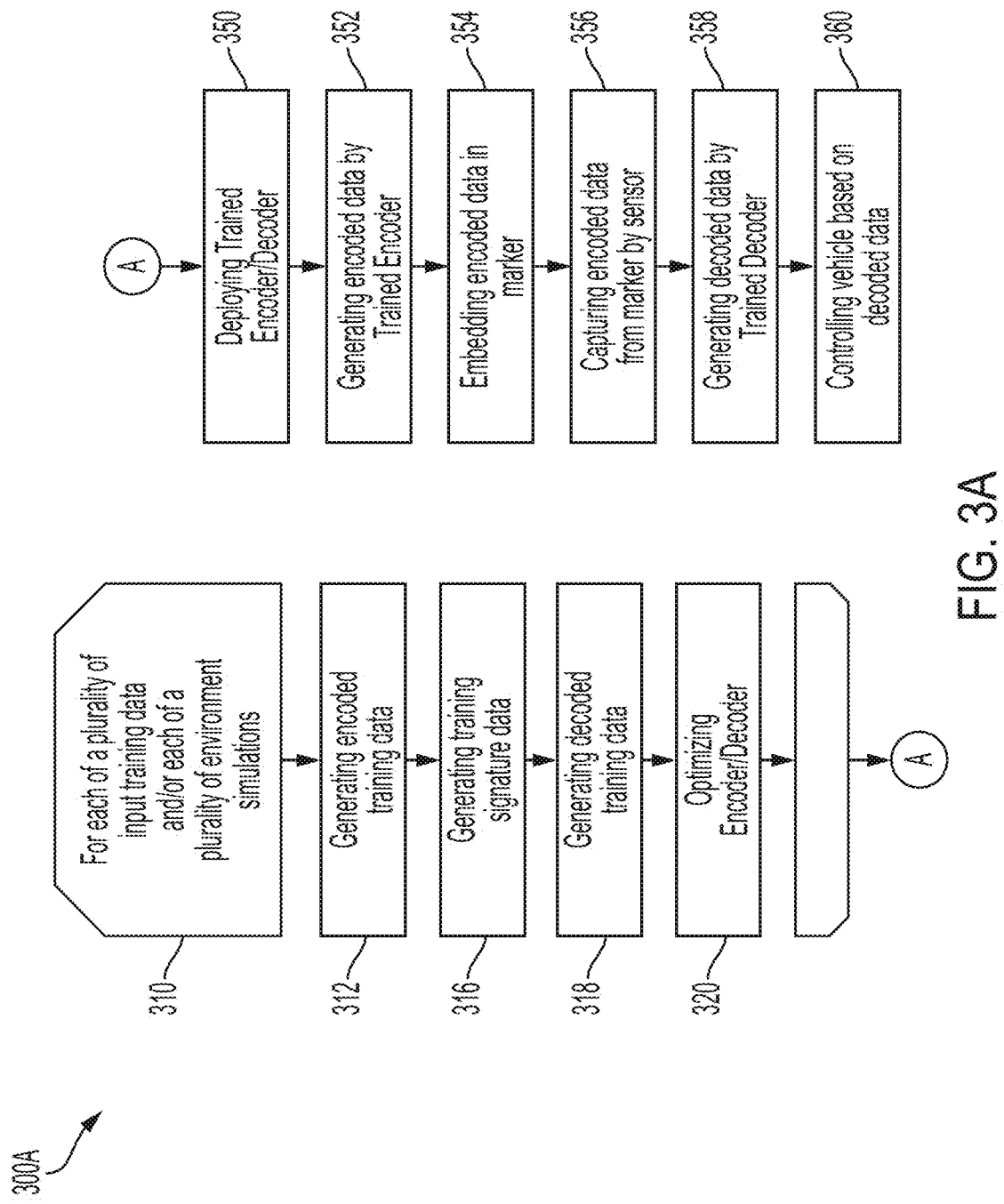

SYSTEM FOR AND METHOD OF DATA ENCODING AND/OR DECODING USING NEURAL NETWORKS

PRIORITY CLAIM

The present application claims the priority benefit of U.S. Provisional Patent Application No. 62/679,508, filed Jun. 1, 2018, the entirety of which is hereby incorporated by reference.

BACKGROUND

Guideway mounted vehicles include communication train based control (CTBC) systems to receive movement instructions from wayside mounted devices adjacent to a guideway. The CTBC systems are used to determine a location and a speed of the guideway mounted vehicle. The CTBC systems determine the location and speed by interrogating transponders positioned along the guideway. The CTBC systems report the determined location and speed to a centralized control system or to a de-centralized control system through the wayside mounted devices. The centralized or de-centralized control system stores the location and speed information for guideway mounted vehicles within a control zone. Based on this stored location and speed information, the centralized or de-centralized control system generates movement instructions for the guideway mounted vehicles. When communication between the guideway mounted vehicle and the centralized or de-centralized control system is interrupted, the guideway mounted vehicle is braked to a stop to await a manual driver to control the guideway mounted vehicle. Communication interruption occurs not only when a communication system ceases to function, but also when the communication system transmits incorrect information or when the CTBC rejects an instruction due to incorrect sequencing or corruption of the instruction.

Robustness and/or integrity of instruction communication is a consideration in controlling guideway mounted vehicles.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

FIG. 3A is flow chart of a method, in accordance with one or more embodiments.

DETAILED DESCRIPTION

Figure 1:
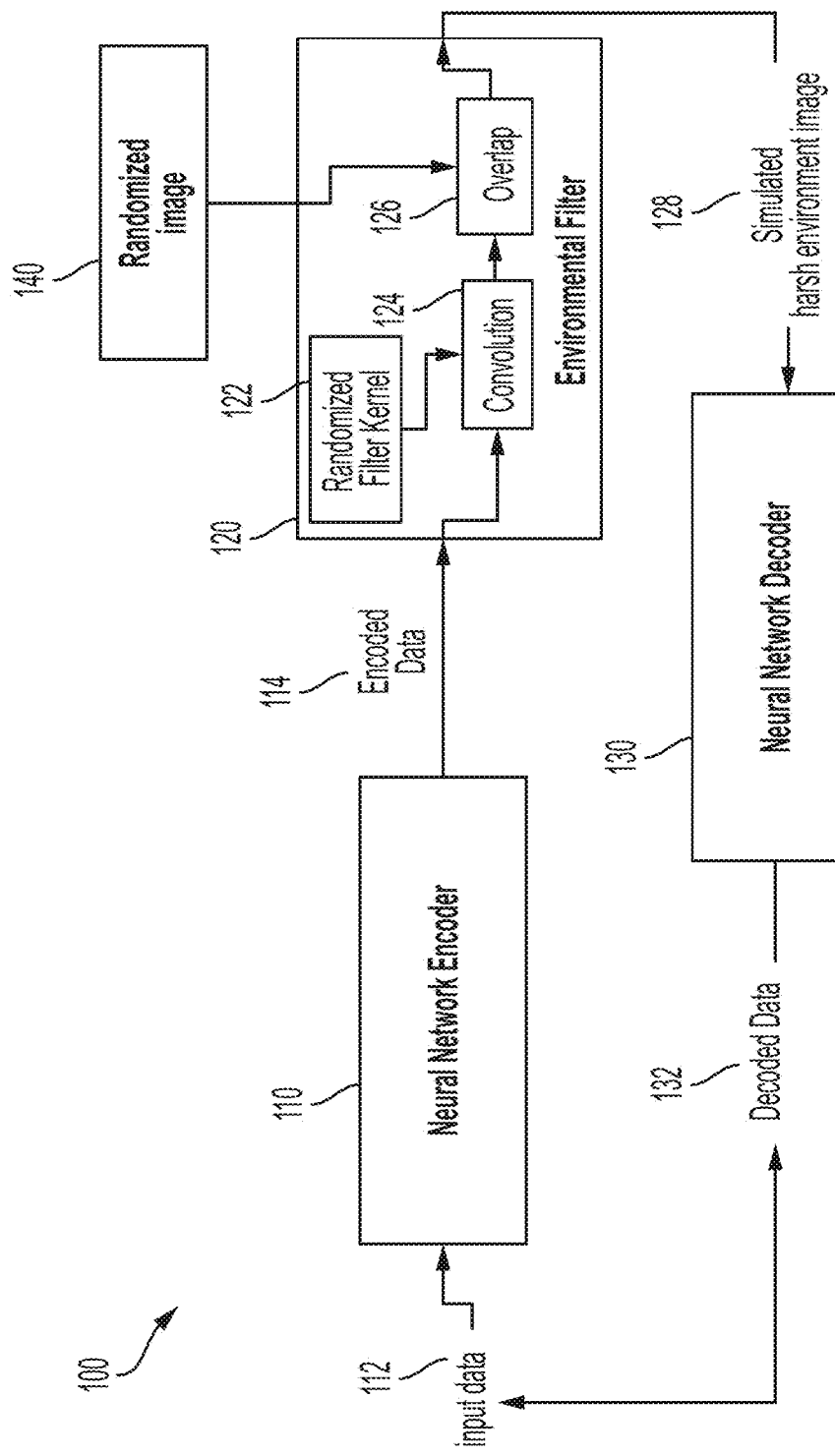
FIG. 1 is a diagram of a system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus, object in use or operation, or objects scanned in a three dimensional space, in addition to the orientation thereof depicted in the figures. The apparatus may be otherwise oriented (rotated 90 degrees or at other orientations) and the spatially relative descriptors used herein may likewise be interpreted accordingly.

In some embodiments, a guideway is a track, rail, roadway, cable, series of reflectors, series of signs, a visible or invisible path, a projected path, a laser-guided path, a global positioning system (GPS)-directed path, an object-studded path or other suitable format of guide, path, track, road or the like on which, over which, below which, beside which, or along which a vehicle is caused to travel.

In some embodiments, a vehicle travelling along a guideway captures data from markers, such as signs, arranged along the guideway, decodes the captured data, and uses the decoded data to control the travel of the vehicle. Various factors may affect how the data are captured which eventually may affect accuracy and/or integrity of the decoded data. To ensure that the captured data are correctly decoded, an encoder that encodes the data embedded in a marker to be captured and a decoder that decodes the captured data are a pair of neural network encoder-decoder trained together with an environmental filter. The environmental filter combines the data encoded by the encoder with at least one randomized image before the encoded data are decoded by the decoder. The at least one randomized image represents one or more environmental conditions under which data embedded in markers may be captured in the real world. Because the encoder and decoder have been trained by machine learning to operate in real world conditions, robustness and/or accuracy and/or integrity of the data encoding-decoding is/are improved.

FIG. 1 is a diagram of a system 100, in accordance with one or more embodiments. The system 100 implements a training phase in some embodiments. The system 100 comprises a neural network encoder 110, an environmental filter 120, and a neural network decoder 130. For simplicity, "neural network encoder" and "neural network decoder" are referred to herein as "encoder" and "decoder," respectively. In some embodiments, the encoder 110, environmental filter 120 and decoder 130 is/are implemented in at least one processor or computing platform as described with respect to FIG. 4. In at least one embodiment, the encoder 110, environmental filter 120 and decoder 130 are implemented in a Graphics Processing Unit (GPU) cluster as is common in the neural network machine learning field. In at least one embodiment, existing machine learning libraries including, but not limited to, Pytorch or Tensorflow are used for the training phase.

The encoder 110 and the decoder 130 are a pair of neural network encoder-decoder. A neural network, or artificial neural network (ANN), includes one or more computing platforms performing machine learning to solve problems in a manner similar to a biological brain, e.g., a human brain. To do so, the neural network includes a plurality of nodes, or artificial neurons, connected together to simulate neurons in a biological brain. Nodes of a neural network are arranged in layers. A signal travels from an input layer through multiple layers of the neural network to an output layer. As the signal travels through the neural network, the signal is modified by weights of the nodes and/or weights of connections among the nodes. The weights are adjusted as learning or training proceeds in the neural network. Examples of neural networks include, but are not limited to, recurrent neural network, multilayer perceptron, convolutional neural network etc. In one or more embodiments described herein, the encoder 110 and decoder 130 are implemented as a convolutional neural network. For example, the encoder 110 is a deconvolution neural network encoder and the decoder 130 is a convolution neural network decoder. Other types of neural networks are within the scopes of various embodiments.

In a training process, the encoder 110 learns to encode input data to generate encoded data. The decoder 130, on the other hand, learns to decode encoded data to generate decoded data that, as the learning proceeds, increasingly matches the input data supplied to the encoder 110. In an ideal world, the encoded data output by the encoder 110 would be directly received, unmodified or substantially unmodified, by the decoder 130 for decoding. However, in the real world, the encoded data output by the encoder 110 are subject to modifications by a various factors before being decoded by the decoder 130. For example, as described herein with respect to FIG. 2, the encoded data are embedded in a marker 270, such as a sign along a guideway 260, and then captured by, e.g., a sensor 252 on a vehicle 250 travelling along the guideway 260, before being decoded by the decoder 130/230. Various factors existing at or around the data capturing by the sensor affect how the data are captured. Such factors include, but are not limited to, relative distance and/or orientation between the marker and the sensor, reflectance, glare and/or other physical, optical and/or electromagnetic properties of the marker, equipment error, noise, interference, day/night lighting conditions, reduced visibility due to partial obstruction of the marker caused by dirt, paint, mud or any other obstruction on the marker or on the vehicle's windshield, reduced visibility due to curved guideway with line-of-sight constraints (e.g., tunnel walls . . . ), adverse weather conditions such as rain, water, fog, cloud, etc. The factors that affect capturing of encoded data by a sensor in the real world are referred to herein as "environmental conditions."

To simulate environmental conditions in the training process of the encoder 110 and the decoder 130, the environmental filter 120 is provided between the encoder 110 and environmental filter 120. In some embodiments, the environmental filter 120 is configured as at least one node or layer between the encoder 110 and the decoder 130. The connection of the encoder 110 to the environmental filter 120 and then to the decoder 130 creates a neural network in which the encoder 110, the environmental filter 120 and the decoder 130 are trained together.

The encoder 110 is configured to encode input data 112 to generate encoded data 114 from the input data 112. The environmental filter 120 is communicably connected with the encoder 110 to receive the encoded data 114. The environmental filter 120 is configured to combine the encoded data 114 with at least one randomized image 140, e.g., by an overlapping operation 126 of the environmental filter 120, to generate signature data 128 corresponding to the input data 112. The decoder 130 is configured to be trained together with the encoder 110 and the environmental filter 120 to decode the signature data 128 to generate decoded data 132 corresponding to the input data 112.

In at least one embodiment, the environmental filter 120 further includes a randomized filter kernel 122 configured to perform at least one randomized image transformation, e.g., by a convolution operation 124, on the encoded data 114. In the example configuration in FIG. 1, the convolution operation 124 is performed on the encoded data 114 before the overlapping operation 126. However, other configurations are within the scopes of various embodiments. For example, in at least one embodiment, the convolution operation 124 is performed after the overlapping operation 126, or the convolution operation 124 and the overlapping operation 126 are performed concurrently on the encoded data 114. In at least one embodiment, the convolution operation 124 includes a deep convolutional neural network architecture with many nodes and operation in both depth and width. The combination of the at least one randomized image 140 into the encoded data 114 and/or the at least one randomized image transformation of the encoded data 114 by the randomized filter kernel 122 in the training of the encoder 110 and decoder 130 simulate various environmental conditions under which the encoder 110 and decoder 130, when trained, will be operate in the real world. In some embodiments, the environmental filter 120 is configured to simulate harsh detection conditions for the decoder 130 to detect the encoded data embedded in a marker. Such conditions, in at least one embodiment, represent the toughest detection conditions possible for the decoder 130 to detect and decode the encoded data embedded in the marker.

The input data 112 fed to the encoder 110 include data to be transmitted, through successive encoding and decoding, to an intended receiving device at an output of the decoder 130. In some embodiments, the input data 112 include data intended for a vehicle on which the decoder 130 is installed. For example, the input data 112 include a fixed length data string with information including, but not limited to, geographical coordinates, direction of travel, speed limits, temporary restrictions etc. for controlling the vehicle.

The encoder 110 learns to encode the input data 112, for example, via successive deconvolution and depooling layers of the neural network, to obtain the encoded data 114. In at least one embodiment, the input data 112 in the form of a fixed length data string are encoded to obtain the encoded data 114 in the form of a fixed size image with multiple pixels, such as a QR code. Other configurations are within the scopes of various embodiments. For example, the encoded data 114 are not necessarily in the form of a 2D image, and include any form of data that are embeddable in a marker as described herein.

The encoded data 114 are passed through the environmental filter 120 which applies at least one randomized transformation, e.g., at the convolution operation 124, to the encoded data 114 and/or combines the encoded data 114 with the at least one randomized image 140, e.g., at the overlapping operation 126. The result is the signature data 128 which, in at least one embodiment, include a simulated harsh environment image with information of the encoded data 114 but in a form that is more difficult to detect and decode due to the simulation of one or more environmental conditions impacted by the at least one randomized transformation at the convolution operation 124 and/or at least one randomized image 140 at the overlapping operation 126. Examples of transformations performed at the convolution operation 124 include, but are not limited to, distortion, skew, rescaling, rebalance, normalization, and equalization. Other transformations are within the scopes of various embodiments. In the overlapping operation 126, the encoded data 114 are superimposed on the at least one randomized image 140. This is an example of how the encoded data 114 are combined with the at least one randomized image 140. Other data combining techniques for merging or modifying the encoded data 114 with data of the at least one randomized image 140 are within the scopes of various embodiments.

In some embodiments, the at least one randomized image 140 includes a plurality of images 140 one or more of which is/are randomly chosen to be combined with each encoded data 114 passing through the environmental filter 120. In the example configuration in FIG. 1, the images 140 are stored in at least one computer readable storage medium outside the environmental filter 120, and are supplied to the environmental filter 120, e.g., via a network or an input/output (I/O) interface. Other arrangements in which at least one of the images 140 is stored internally in the environmental filter 120 are within the scopes of various embodiments. The images 140 include simulated images and/or images of real world scenes that model or capture one or more effects of environmental conditions to be impacted on the encoded data 114.

The images 140 include at least data in the same domain in which a sensor configured to capture data for the decoder 130 after training operates. For example, when the sensor is a camera operating in the visual/visible domain of the electromagnetic spectrum, the images 140 include at least data in the visual/visible domain. When the sensor is configured to capture data in a non-visual domain, such as near infrared (NIR), far infrared (FIR), Light Detection And Ranging (LIDAR), radar, or radio frequency (RF), the images 140 include at least data in the same non-visual domain, such as NIR, FIR, LIDAR, radar, or RF, respectively. In at least one embodiment, the images 140 include data in multiple domains to train the encoder 110 and decoder 130 to operate with multiple sensors in multiple domains.

In at least one embodiment where the sensor operates in the visual, NIR or FIR domain, the images 140 include noises in the visual, NIR or FIR domain, respectively. Such noises include, but are not limited to, reflectance or other physical, optical and/or electromagnetic properties of the marker, partial obstruction, visibility, weather conditions such as rain, water, fog, lighting, cloud etc.

In at least one embodiment where the sensor includes a LIDAR scanner, the images 140 include simulated LIDAR environmental noise artifacts including, but not limited to, distortion, scan errors, water, fog, noise motion, etc. In at least one LIDAR embodiment, the environmental filter 120 provides a LIDAR scan simulation where unique signatures visible in LIDAR are overlayed onto a 4D (x, y, z, intensity) LIDAR scan map exposed to simulated environmental noise artifacts. In real world operations and/or online training as described with respect to FIG. 2, a 4D sign (or marker) is used to communicate the unique signatures to a vehicle with the LIDAR scanner via voxels drawn on the sign which is either active or passive.

In at least one embodiment where the sensor includes a radar that obtains a 4D scan map of the environment, the images 140 include simulated noises including, but not limited to, magnetic interference, target ghosting, noise motion, etc. Some radar embodiments operate similarly to the described LIDAR embodiments where the radar is a scanning radar, e.g., Active Electronically Scanned Array (AESA), and obtains a 4D scan map of the environment. Other radar configurations are within the scopes of various embodiments.

In at least one embodiment where the sensor includes an RF transceiver or radio, the images 140 include, but are not limited to, RF noises and interference. In at least one RF embodiment, 1-way or 2-way communication across a radio channel is employed where the sensor is an RF transceiver on the vehicle, and a marker or sign includes a communication antenna that generates the encoded data in the form of RF signals. For example, a bidirectional antenna is provided as the sign, and another bidirectional antenna is provided as part of the RF transceiver on the vehicle. The generated and captured encoded data include RF signals in accordance with a bidirectional communication protocol. In at least one embodiment, in addition to communication quality, the communication speed is also a metric in the objective function to be optimized. As in the other described embodiments, a realistic environmental simulation is performed by the environmental filter 120 to distort the encoded data in the RF signals by overlaying onto the realistic channel traffic. In at least one embodiment, the channel traffic is recorded beforehand in the operational area of interest and used in the environmental simulator 120 to optimize the communication protocol for the expected electromagnetism in the environment.

The signature data 128 output from the environmental filter 120 are fed to the decoder 130 which learns to extract and decode the encoded data 114, despite the simulated environmental conditions caused by the at least one randomized image 140, to attempt to reconstruct the input data 112. The decoded data 132 output by the decoder 130 are compared to the input data 112 to obtain a reconstruction error. In at least one embodiment, the reconstruction error is evaluated by a loss function. An objective of the training is to minimize the loss function. For example, error values are calculated for nodes of the output layer of the decoder 130 where the decoded data 132 are output. The error values are then back-propagated from the output layer of the decoder 130, through other layers of the neural network including the decoder 130, environmental filter 120 and encoder 110, to the input layer of the encoder 110 where the input data 112 were received. The error values are used to calculate the gradient of the loss function. The gradient of the loss function is used in an optimization algorithm to update or adjust the weights of the nodes in the neural network, in an attempt to minimize the loss function. By passing a large number of sets of input data (also referred to herein as input training data) through the encoder 110, and randomly applying various transformations and/or randomly combining various environmental condition simulation images by the environmental filter 120, a large number of sets of decoded data (also referred to herein as decoded training data) are generated by the decoder 130. The back-propagation and optimization process is performed multiple times for corresponding pairs of input training data and decoded training data to find the optimal solution for the encoder to generate the encoded data to be embedded in a marker, and for the decoder to decode the encoded data captured from the marker. In at least one embodiment, the solution is an "end-to-end" optimization of the encoder, environmental filter and decoder, rather than a local optimization of each component. When the training of the encoder 110 and decoder 130 together with the environmental filter 120 is considered completed, the trained pair of encoder and decoder is deployed for real world operations. The above described learning technique with end-to-end optimization and back-propagation is an example. Other learning techniques are within the scopes of various embodiments.

Figure 2:
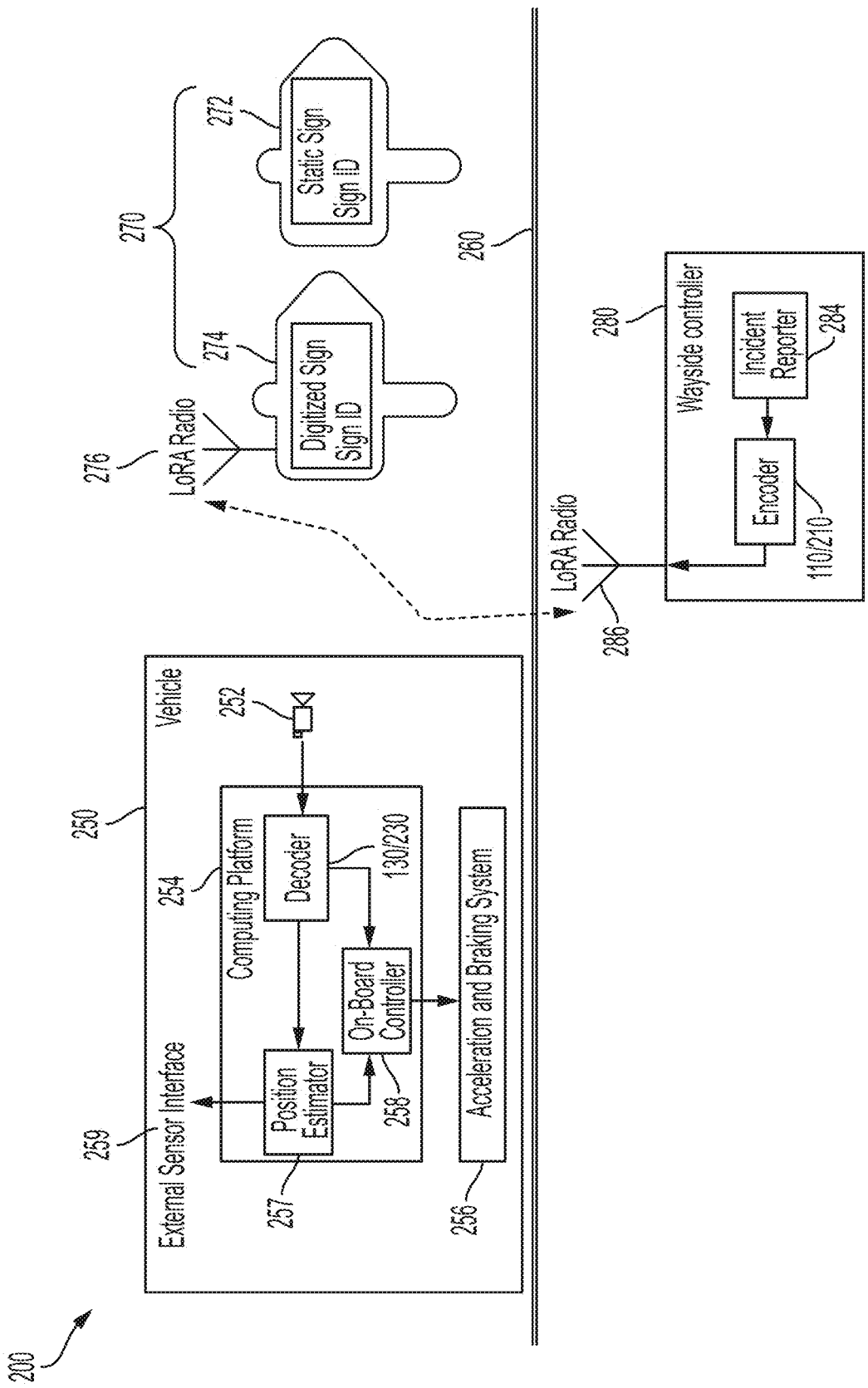
FIG. 2 is a diagram of a system, in accordance with one or more embodiments.

FIG. 2 is a diagram of a system 200, in accordance with one or more embodiments. In some embodiments, the system 200 includes a trained pair of encoder and decoder in real world operations. In at least one embodiment described herein, the system 200 implements an online training phase for fine-tuning a pair of encoder and decoder that has been trained offline, for example, by the system 100.

In a real world operation arrangement in accordance with some embodiments, the system 200 comprises a trained encoder 210 and a trained decoder 230. In at least one embodiment, the trained encoder 210 and the trained decoder 230 correspond to the encoder 110 and the decoder 130, respectively, that have been trained together with the environmental filter 120 in the system 100 of FIG. 1. The trained decoder 230 is deployed on a vehicle 250 configured to travel along a guideway 260. The trained encoder 210 encodes input data intended for the vehicle 250 into encoded data which are embedded in at least one marker 270 arranged along the guideway 260.

The vehicle 250 includes a sensor 252, a computing platform 254 and an acceleration and braking system 256. The sensor 252 is configured to capture the data encoded by the trained encoder 210 and embedded in the least one marker 270 along the guideway 260. In at least one embodiment, the sensor 252 is a camera operating in the visual/visible domain of the electromagnetic spectrum. In some embodiments, the sensor 252 is configured to capture data in a non-visual domain, such as NIR, FIR, LIDAR, radar, or RF. Examples of the sensor 252 include, but are not limited to, NIR sensor/camera, FIR sensor/camera, LIDAR scanner, radar scanner and RF transceiver. The type and/or operating domain of the sensor 252 is/are selected based on the type of the least one marker 270 from which the sensor 252 is configured to capture data.

The computing platform 254 is coupled to the sensor 252, for example, through an I/O interface. The computing platform 254 includes hardware, or a combination of hardware and software. In at least one embodiment, the computing platform 254 corresponds to a computing platform described with respect to FIG. 4. The trained decoder 230 is implemented on the computing platform 254. In the example configuration in FIG. 2, a vehicle on-board controller (VOBC) 258 and a position estimator 257 are also implemented on the computing platform 254. Other configurations are within the scopes of various embodiments. For example, the VOBC 258 is implemented on a different computing platform from the computing platform 254 of the trained decoder 230, and/or the position estimator 257 is omitted.

The acceleration and braking system 256 is coupled to the VOBC 258 to be controlled by the VOBC 258. In an example configuration, the acceleration and braking system 256 includes an engine or an electric motor for moving and accelerating the vehicle 250, and a break for decelerating and stopping the vehicle 250. Other movements of the vehicle 250 are also effected by the acceleration and braking system 256 in various embodiments. For example, in embodiments where steering of the vehicle 250 (e.g., a road vehicle) is possible, the acceleration and braking system 256 also includes a steering mechanism for steering the vehicle 250.

The sensor 252 is configured to capture encoded data generated by the trained encoder 210 and embedded in the least one marker 270 installed along the guideway 260. The trained decoder 230 is configured to decode the encoded data captured by the sensor 252 to generate decoded data corresponding to the input data encoded into the encoded data by the trained encoder 210. The VOBC 258 is configured to control the vehicle 250, through the acceleration and braking system 256, based on the decoded data supplied from the trained decoder 230. Because the trained decoder 230 has been trained by machine learning together with the trained encoder 210 to operate in various environmental conditions simulated by the environmental filter 120, the input data intended for the vehicle 250 and encoded by the trained encoder 210 is accurately decoded by the trained decoder 230 and the vehicle 250 is therefore precisely controlled.

In at least one embodiment where the position estimator 257 is provided, the decoded data output by the trained decoder 230 are supplied to the position estimator 257 which processes the decoded data and provides an accurate position of the vehicle 250 to the VOBC 258 for precise control of the vehicle 250. In at least one embodiment, the position estimator 257 obtains the position of the vehicle 250 based on data fed from an external sensor interface 259, in addition to the decoded data supplied by the trained decoder 230. For example, the position estimator 257 is based on a unscented Kalman Filter (KF) which uses one or more types of sensors including, but not limited to, (a) low cost inertial measurement unit (IMU), (b) commercial off-the-shelf (COTS) radar and (c) landmark. A landmark example configuration is described herein. The landmark, which is tied to a unique geographical location on the map is used to initialize the position at "cold start." The guideway map is represented with a diagraph (e.g., a network of nodes and edges) with the position determined in terms of edge identifier and the offset (from a node). This is similar to a technology in which the edges are "straight" lines. In reality, the edges are 3D curved lines and therefore the edges' 3D curvature is represented by cubic splines, i.e., between two edges support points are determined and a cubic spline represents the 3D curvature between support points pairs. Neighbouring splines in each support point are set to satisfy equality of the spline value, its first derivative and second derivative. Once the position is initialized, the position is estimated (e.g., by a prediction) using the IMU 3D specific force and angular speed measurements. The predicted position is constrained to the spline. This example configuration is a unique to railways as the train is constrained to the rails. Then, the speed measurements (from the sensor, such as a radar) and location information (from the landmark) are used to update the predicted position.

As described herein, the trained encoder 210 encodes input data intended for the vehicle 250 into encoded data which are embedded in at least one marker 270. The input data intended for the vehicle 250 include, but are not limited to, landmark reference location in terms of ID or geographical coordinates, direction of travel, speed limits, temporary restrictions etc. In at least one embodiment, to ensure the integrity of the decoded data, an integrity signature such as, but not limited to, a checksum, CRC, MD4, M05 or MD6 cryptographic hash function is embedded in the input data supplied to the trained encoder 210. The decoded data output by the trained decoder 230 will include a data portion corresponding to the input data intended for the vehicle 250, and a cryptographic hash. The trained decoder 230 or the VOBC 258 of the vehicle 250 will verify the data stream integrity by comparing the cryptographic hash included in the decoded data with a cryptographic hash calculated from the content of the data portion of the decoded data.

The encoded data generated by the trained encoder 210 are embedded in the least one marker 270 which includes a static sign 272 (also referred to herein as passive sign or static marker) and/or a digitized sign 274 (also referred to herein as active sign or variable marker). The static sign 272 is a sign in which the encoded data are permanently embedded, for example, by printing, painting, molding, or by a fixed physical configuration such as size, shape or pattern of the sign's portion where the encoded data are embedded. In other words, the static sign 272 is not configured to dynamically change or update the embedded encoded data.

In contrast, the digitized sign 274 is configured to change or update the embedded encoded data. For example, the encoded data embedded in the digitized sign 274 are changeable electrically, i.e., by an electric signal, although other configurations are within the scopes of various embodiments. In the example configuration in FIG. 2, the digitized sign 274 has an antenna 276 communicable with a corresponding antenna 286 of a wayside controller 280 arranged near or along the guideway 260. For example, the antenna 276 and antenna 286 are antennas of Long Range Wide Area Network (LoRA-WAN) radios. The wayside controller 280 includes hardware, or a combination of hardware and software. In at least one embodiment, the wayside controller 280 corresponds to a computing platform described with respect to FIG. 4. The wayside controller 280 includes the trained encoder 210 and an incident reporter 284. For example, the incident reporter 284 includes a wired or wireless communication circuit communicable with a traffic control center to receive therefrom updated traffic information or command, e.g., information about incidents ahead or temporary speed restrictions. The updated traffic information or command received by the incident reporter 284 is supplied as updated input data to the trained encoder 210. The trained encoder 210 generates updated encoded data from the updated input data, and the wayside controller 280 transmits the updated encoded data via the antenna 286 and antenna 276 to the digitized sign 274. The digitized sign 274 update the encoded data embedded therein, e.g., by showing the updated encoded data on a display, for example, an (Internet of Things) IoT LED display that is reprogrammable in real-time from the wayside controller 280 to display the updated information.

In at least one embodiment, both sign types, e.g., a static sign 272 and a digitized sign 274, are used to display the same encoded data, to allow for redundant data transmission beyond the described use of wayside radios.

The above description is an example, and other configurations are within the scopes of various embodiments. For example, multiple instances of the trained encoder 210 are arranged along the guideway 260 in multiple wayside controllers 280 to update multiple digitized signs 274, while another instance of the trained encoder 210 is installed in a manufacturing facility (not shown) where static signs 272 are made. In at least one embodiment, the wayside controller 280 is communicated by a wire or cable with the digitized sign 274, or the wayside controller 280 is a handheld device that is pluggable into the digitized sign 274 to update the embedded data.

In an online training arrangement in accordance with some embodiments, the system 200 comprises an offline-trained encoder 110 instead of the trained encoder 210, and an offline-trained decoder 130 instead of the trained decoder 230. Other components of the system 200 are the same as or similar to those described in the real world operation arrangement.

The offline-trained encoder 110 and offline-trained decoder 130 have been trained together with the environmental filter 120 in the system 100 as described with respect to FIG. 1. The training phase in the system 100 is referred to, in at least one embodiment, as offline training, because the encoder 110 and decoder 130 are trained with environmental condition simulation provided by the environmental filter 120, without involving real world data capturing using a sensor. In some embodiments, the learning result of the offline training is acceptable, and the offline-trained encoder 110 and offline-trained decoder 130 are deployed as the trained encoder 210 and trained decoder 230, respectively, for real world operations. In at least one embodiment, the learning result of the offline training is further improved or fine-tuned by the online training phase in the system 200, in which the offline-trained encoder 110 and offline-trained decoder 130 are continued to be trained but with real world data capturing through the sensor 252, instead of the simulation provided by the environmental filter 120.

In an example of the online training phase, the offline-trained encoder 110 and offline-trained decoder 130 are ran in real-time with at least one active sign, such as the digitized sign 274. In at least one embodiment, at least one passive sign, such as the static sign 272, is used. The encoder 110 generates encoded data to be embedded in the active or passive sign, and the decoder 130 decodes data captured by the sensor 252 (e.g., a camera, a LIDAR or radar scanner, or an RF radio/transceiver) to compute the reconstruction error as in the offline training phase. The error gradient is back-propagated through the decoder 130 as in the offline training phase. However, unlike in the offline training phase, it is not back-propagated through the environment since the environmental model is not completely known. Therefore, supervised learning for the encoder 110 is not performed in some embodiments. In at least one embodiment, reinforcement learning is performed instead for the encoder 110, without gradient information from the objective or the decoded data, but with an additional award/penalty metric communicated from the vehicle 250, e.g., from the computing platform 254 which runs the decoder 130 and computes the error. The encoder 110 is then trained with this additional award/penalty metric. In some embodiments, since the encoder 110 and decoder 130 are already mostly trained in the offline training phase, the online training phase is simply a fine-tuning for the exact operational environment in the real world, and as such the learning rates are set very low for the online training phase. After the online training phase, the encoder 110 and decoder 130 are considered as the trained encoder 210 and trained decoder 230, respectively, and are ready for real world operations.

Compared to alternative approaches, such as RFID or QR encoding, one or more of the following advantages are achievable in at least one embodiment: (1) Robust and reliable sign signature (encoded data) decoding in real-time railway or road vehicle environment, (2) Robust and reliable sign signature decoding without classification of the detected sign, (3) Sign signature cryptographic hash verification in real-time railway or road vehicle environment, (4) Sign signature cryptographic hash verification without classification of the detected sign, (5) Robust, reliable and accurate (+/−10 cm) estimation of the range to the sign in real-time railway or road vehicle environment, (6) Robust, reliable and accurate (+/−10 cm) estimation of the range to the sign without classification of the detected sign, (7) Fully secure data encryption embedded in the system through the use of deep neural networks.

In an example, alternative approaches for sign detection, classification and decoding, include barcode or QR decoding typically based on ad-hoc computer vision algorithms with relatively poor reliability typically far lower than 90% accuracy even when working under ideal conditions. Under harsh environmental conditions such as weather, lighting, visibility, etc. barcode or QR decoding algorithms will have a significantly poorer success rate. Barcode or QR decoding algorithms do not estimate the range to the sign and do not address secure data transmission issues. Barcode or QR decoding algorithms are designed for the consumer market or storage facility applications and not for encoded data (signature) decoding by a system installed on a vehicle moving at high speed on the guideway in harsh environmental conditions with long-range reliably detection capability. These disadvantages are resolved by the approaches described herein with respect to one or more embodiments.

In another example, alternative approaches include RFID tags used to track vehicles through transmitting IDs to a train's RFID reader when the train drives over the RFID tag. This technology suffers from one or more of poor accuracy, high cost, high false negative detection and in some cases require external power which may be difficult to route over long tracks. Other potential issues include high installation and maintenance cost, high false negative and high false positive because of a lack of unique identifiers. In contrast, the approaches described herein with respect to one or more embodiments permit encoded data (signature) embedded in a sign to be decoded in a much more cost effective manner than using traditional localization techniques such as RFID tag or loop crossover technologies. Reasons include, but are not limited to, (a) the on-board sensor and computing platform cost is less than the cost of the RFID reader and its associated computer, and (b) less trackside infrastructure is needed and with much lower life cycle cost (less maintenance). From the operation view point, the approaches described herein with respect to one or more embodiments provide the sign detection range that is longer than the RFID tag or loop crossover detection range and with more accurate (lower) position error.

Specifically, in some embodiments, once trained, either offline or both offline and online, the trained encoder is configured to optimally encode input data to output encoded data in the form of a robust, unique and secure pattern (signature), and the trained decoder is configured to optimally decode the pattern (signature).

In some embodiments, a sensor operating in the visual spectrum domain or in a non-visual spectrum domain captures the encoded data embedded in a sign to output captured data in the form of 2D/3D pixels matrix (e.g., where the sensor includes a camera) or 3D/4D point cloud data (e.g., where the sensor includes a LIDAR or radar scanner). The decoder has already been trained together with the encoder to decode the encoded data in various harsh environmental conditions (such as different orientation or relative position between the sensor and the sign, different visibility conditions due to weather or lighting, partial "observability" of the encoded data on the sign because of dirt, paint, mud or any other obstruction on the sign or on the vehicle's windshield interfering with the decoded data detection). Therefore, it is possible in at least one embodiment for the decoder to extract the encoded data from the sign, without relying on any detection algorithms. This is robust to real-world conditions and is computationally far simpler than alternative methods, such as QR encoding. For example, QR encoding relies on the 3 finders at the corners of a sign to detect that the sign is actually a QR sign. The trained decoder in accordance with some embodiments is configured to decode the data encoded by a paired, trained encoder, without dependency on such information.

In some embodiments, since convolutional neural networks are easily generalizable, general purpose GPU computing (GPGPU) methods are usable to greatly accelerate decoding, far surpassing the speed of barcode decoding from images.

In some embodiments, since the training target is the optimal encoding/decoding of data for secured data transfer, when an RF transceiver (radio) is used as a sensor, the throughput of the link is optimal in the context of data decoding.

In some embodiments, the integrity of the data encoding/decoding is improved, for example, by incorporating an integrity signature such as a checksum or a cryptographic hash function in the input data to be encoded.

In some embodiments, the trained decoder, also referred to herein as real-time decoder, is deployed on a low power embedded computing platform with heterogeneous computing support, such as but not limited to an NVIDIA Jetson TX2. In at least one embodiment, this arrangement is advantageous in that no, or only minimal, change is required to be made to the existing hardware of a vehicle, especially its VOBC.

In some embodiments, because the encoded data (signature) embedded in a sign are generated and decoded using neural network techniques, it is improbable to generate fake signs or decode existing signs without having physical encoder/decoder which are complex systems with millions of parameters that is very difficult to reproduce. Security of the input data intended for a vehicle is therefore enhanced.

Although an intended practical application of one or more of the described embodiments is CBTC systems with the capability of the on-board system, including a trained decoder, to accurately localize the vehicle on the guideway with sufficiently low probability of false positive and false negative localization, other practical applications are within the scopes of various embodiments. In at least one embodiment, further practical applications include highly reliable, encrypted data transmission. For example, a neural network encoder/decoder pair is trained together with an environmental filter to learn the optimal transmission sequences for highly reliable data transmission in heavy electromagnetic field (EMF) environments over an RF channel.

FIG. 3A is flow chart of a method 300A, in accordance with one or more embodiments. In at least one embodiment, the left-side part of the flow chart in FIG. 3A include operations in an offline training as described with respect to the system 100 in FIG. 1, and the right-side part of the flow chart in FIG. 3A include operations in a real world operation as described with respect to the system 200 in FIG. 2.

As indicated at loop operation 310, the method 300A includes operations 312, 316, 318 and 320 which are repeatedly performed for each of a plurality of input training data and/or each of a plurality of environment simulations. For example, operations 312, 316, 318 and 320 are performed for each set of input training data 112 input to the encoder 110 and each environment simulation applied by the environmental filter 120.

At operation 312, encoded training data are generated by an encoder in training. For example, a set of encoded training data 114 is generated by the encoder 110 from a set of input training data 112 input thereto.

At operation 316, training signature data are generated by an environmental filter. For example, the environmental filter 120 applies at least one environment simulation to the set of encoded training data 114 generated by the encoder 110, to obtain a corresponding set of training signature data 128. The set of training signature data 128 includes the set of encoded training data 114, but in a form more difficult to detect or decode due to the at least one environment simulation applied by the environmental filter 120. In at least one embodiment, the at least one environment simulation applied by the environmental filter 120 includes at least one randomized image 140 superimposed on the set of encoded training data 114. In at least one embodiment, the at least one environment simulation applied by the environmental filter 120 further includes include one or more randomized image transformations.

At operation 318, decoded training data are generated by a decoder in training. For example, a set of decoded training data 132 is generated by the decoder 130 from the set of training signature data 128 input thereto from the environmental filter 120.

At operation 320, the encoder in training and the decoder in training are optimized. For example, an end-to-end optimization and back-propagation process is applied to learn an optimal solution to encode and decode data under simulated environmental conditions.

When the optimal solution to encode and decode data under simulated environmental conditions has been obtained after a large number of iterations of operations 312, 316, 318 and 320, the loop operation 310 is terminated and the encoder 110 and decoder 130 are considered trained. The process proceeds to next operation 350.

At operation 350, the trained encoder and decoder are deployed. For example, the trained encoder is deployed as an encoder 210 to a wayside controller 280 to update in real-time a corresponding digitized sign 274. Additionally or alternatively, another instance of the trained encoder is deployed to a manufacturing facility (not shown) where a static sign 272 is made. On the other hand, the trained decoder 230 is deployed on a vehicle 250.

At operation 352, encoded data (signature) are generated by the trained encoder 210 from input data intended for the vehicle 250.

At operation 354, the generated encoded data (signature) are embedded in one or more markers. For example, the encoded data generated by the trained encoder 210 in the wayside controller 280 are transmitted to the digitized sign 274 and embedded, e.g., displayed, in the digitized sign 274 in a changeable manner. Additionally or alternatively, the encoded data generated by another instance of the trained encoder deployed at a manufacturing facility are embedded in the static sign 272 in a permanent manner. The static sign 272 and/or digitized sign 274 is/are arranged along a guideway 260 of the vehicle 250 to be captured and decoded.

At operation 356, the embedded encoded data (signature) are captured by a sensor on the vehicle. For example, a sensor 252 on the vehicle 250 captures the embedded encoded data from the static sign 272 and/or digitized sign 274, and output the captured data to the trained decoder 230 on board the vehicle 250.

At operation 358, decoded data are generated by the trained decoder 230 by decoding the captured data output by the sensor 252. Because the trained encoder 210 and the trained decoder 230 have been trained together by machine learning under various simulated environmental conditions, the decoded data output by the trained decoder 230 match the input data input to the trained encoder 210, with low probability of errors.

At operation 360, the vehicle is controlled based on the decoded data are generated by the trained decoder. For example, a VOBC 258 of the vehicle 250 receives the decoded data, which essentially match the input data intended for the vehicle 250, and then controls movement of the vehicle 250 based on the decoded data through an acceleration and braking system 256 of the vehicle 250. One or more advantages achievable in the system 100 and/or system 200 is/are also achievable in the method 300A.

Figure 3B:
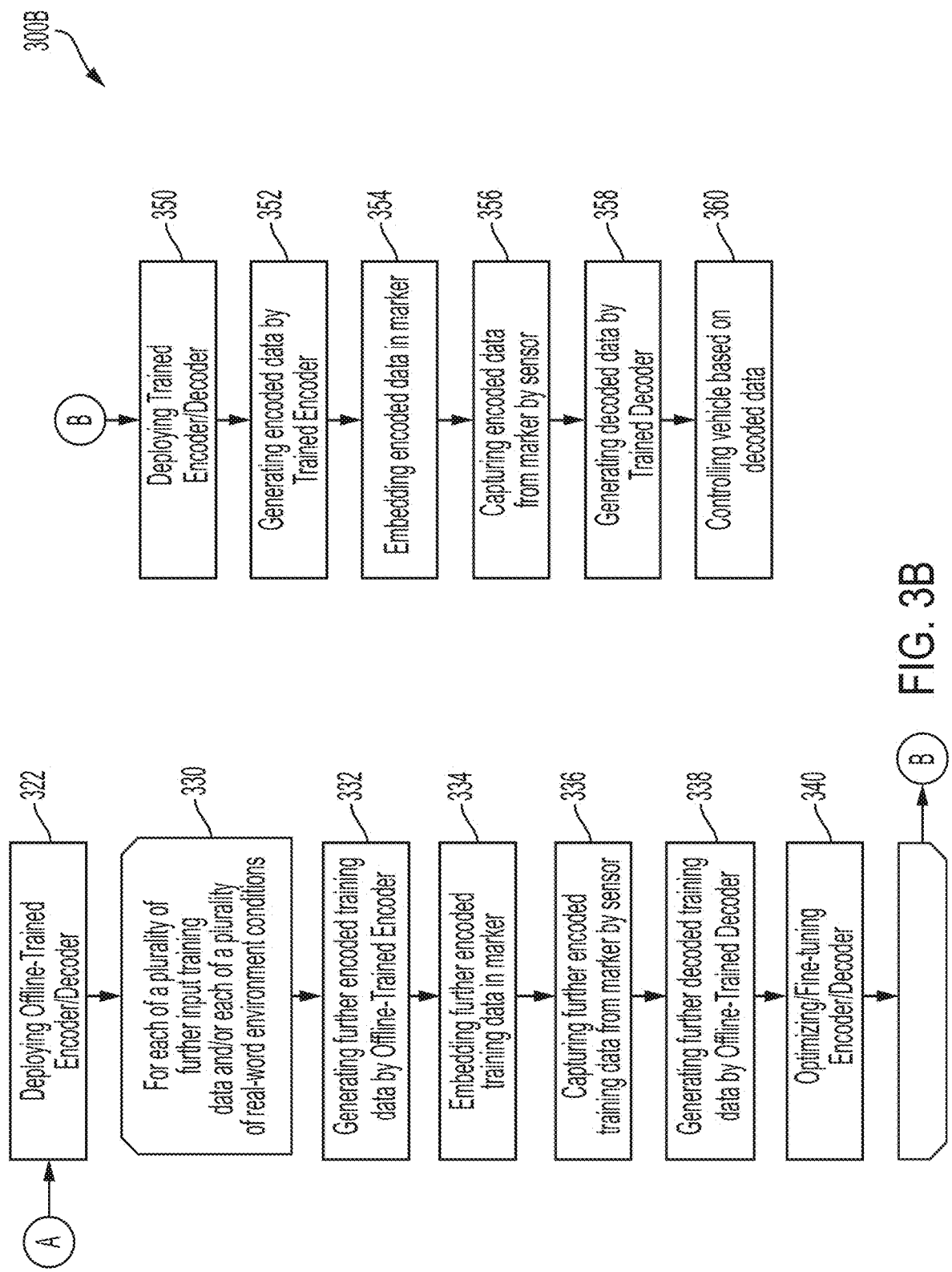
FIG. 3B is flow chart of a method, in accordance with one or more embodiments.

FIG. 3B is flow chart of a method 300B, in accordance with one or more embodiments. In at least one embodiment, the left-side part of the flow chart in FIG. 3B include operations in an online training as described with respect to the system 200 in FIG. 2, and the right-side part of the flow chart in FIG. 3B include operations in a real world operation as also described with respect to the system 200 in FIG. 2.

As indicated at reference numeral A in FIG. 3B, the method 300B includes, before operation 322, an offline training similar to that described with respect to operations 310, 312, 316, 318 and 320 in FIG. 3A.

At operation 322, the offline-trained pair of encoder 110 and decoder 130 is deployed for online training, for example, in a manner similar to the deployment described with respect to operation 350.

As indicated at loop operation 330, the online-training in the method 300B includes operations 332, 334, 336, 338 and 340 which are repeatedly performed for each of a plurality of further input training data and/or each of a plurality of real world environment conditions. For example, operations 332, 334, 336, 338 and 340 are performed for each set of further input training data input to the offline-trained encoder 110 and each real world environment condition that affect data capturing by the sensor 252.

At operations 332, 334, 336 and 338, further encoded training data are generated by the offline-trained encoder 110 from a set of further input training data, embedded in a marker 270, captured by the sensor 252 and decoded by the decoder 130 in manner similar to how encoded data are generated, embedded, captured and decoded in the real world operation described with respect to operations 352, 354, 356 and 358 in FIG. 3A, respectively.

At operation 340, the offline-trained encoder 110 and the offline-trained decoder 130 are optimized or fine-tuned, for example, as described with respect to the online training in the system 200.

When the optimal solution to encode and decode data in the online training has been obtained or fine-tuned after a number of iterations of operations 332, 334, 336, 338 and 340, the loop operation 330 is terminated and the encoder 110 and decoder 130 are considered trained, both offline and online. The process proceeds to the real world operation as described with respect to FIG. 3A, at operations 350, 352, 354, 356, 358 and 360. One or more advantages achievable in the system 100 and/or system 200 is/are also achievable in the method 300B.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 4:
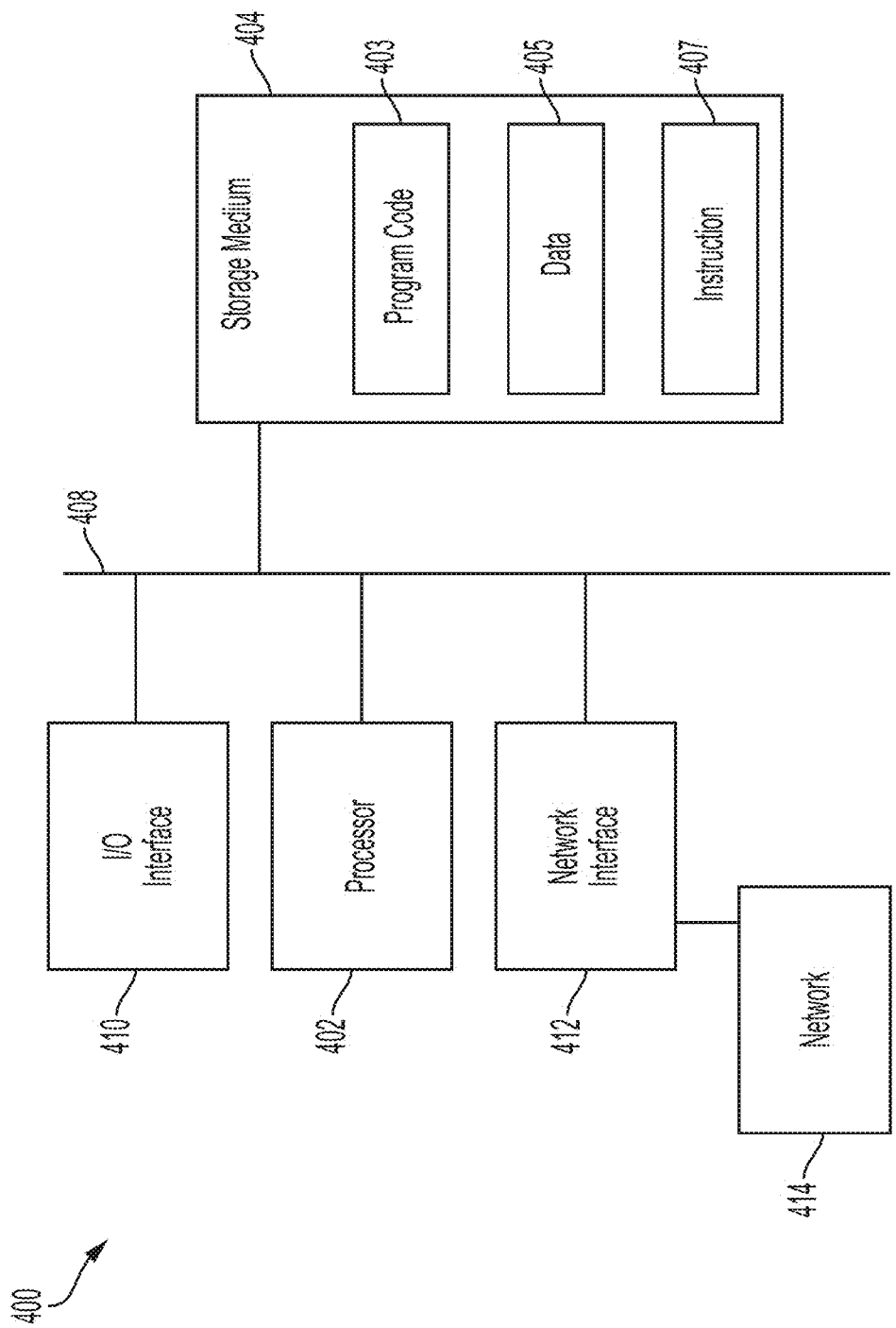
FIG. 4 is a block diagram of a computing platform, in accordance with one or more embodiments.

FIG. 4 is a block diagram of a computing platform 400, in accordance with one or more embodiments. In some embodiments, one or more of the encoder 110, environmental filter 120, decoder 130, trained encoder 210, trained decoder 230, computing platform 254, VOBC 258, wayside controller 280 is/are implemented as one or more computing platform(s) 400.

The computing platform 400 includes a specific-purpose hardware processor 402 and a non-transitory, computer readable storage medium 404 storing computer program code 403 and/or data 405. The computer readable storage medium 404 is also encoded with instructions 407 for interfacing with the vehicle 250. The processor 402 is electrically coupled to the computer readable storage medium 404 via a bus 408. The processor 402 is also electrically coupled to an I/O interface 410 by the bus 408. A network interface 412 is electrically connected to the processor 402 via the bus 408. The network interface 412 is connected to a network 414, so that the processor 402 and/or the computer readable storage medium 404 is/are connectable to external elements and/or systems via the network 414.

In some embodiments, the processor 402 is a central processing unit (CPU), a multi-processor, a distributed processing system, an application specific integrated circuit (ASIC), and/or a suitable hardware processing unit.

In some embodiments, the processor 402 is configured to execute the computer program code 403 and/or access the data 405 stored in the computer readable storage medium 404 in order to cause the computing platform 400 to perform as one or more components of the system 100 and/or system 200, and/or to perform a portion or all of the operations as described in the method 300A and/or method 300B.

In some embodiments, the processor 402 is hard-wired (e.g., as an ASIC) to cause the computing platform 400 to perform as one or more components of the system 100 and/or system 200, and/or to perform a portion or all of the operations as described in the method 300A and/or method 300B.

In some embodiments, the computer readable storage medium 404 is an electronic, magnetic, optical, electromagnetic, infrared, and/or a semiconductor system (or apparatus or device). For example, the computer readable storage medium 404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 404 includes a compact disk-read only memory (CD-ROM), a compact disk-read/write (CD-R/W), and/or a digital video disc (DVD).

In some embodiments, the I/O interface 410 is coupled to external circuitry. In some embodiments, the I/O interface 410 includes a keyboard, keypad, mouse, trackball, trackpad, and/or cursor direction keys for communicating information and commands to processor 402.

In some embodiments, the network interface 412 allows the computing platform 400 to communicate with network 414, to which one or more other computing platforms are connected. The network interface 412 includes wireless network interfaces such as BLUETOOTH, WIFI, WIMAX, GPRS, or WCDMA; or wired network interface such as ETHERNET, USB, or IEEE-1394. In some embodiments, the method 300A and/or method 300B is/are implemented in two or more computing platforms 400, and various executable instructions and/or data are exchanged between different computing platforms 400 via the network 414.

By being configured to execute some or all of functionalities and/or operations described with respect to FIGS. 1, 2, 3A and 3B, the computing platform 400 enables the realization of one or more advantages and/or effects described with respect to FIGS. 1, 2, 3A and 3B.

In some embodiments, a system comprises a neural network encoder, an environmental filter and a neural network decoder. The neural network encoder is configured to generate encoded data from input data. The environmental filter is communicably connected with the encoder and configured to combine the encoded data with at least one randomized image to generate signature data corresponding to the input data. The neural network decoder is configured to be trained together with the encoder and the environmental filter to decode the signature data to generate decoded data corresponding to the input data.

In some embodiments, a system comprises, on a vehicle configured to move along a guideway, a sensor, a trained neural network decoder, and a controller. The sensor is configured to capture encoded data embedded in a marker installed along the guideway. The decoder is configured to decode the encoded data captured by the sensor to generate decoded data corresponding to input data encoded into the encoded data by a trained neural network encoder. The controller is configured to control the vehicle based on the decoded data. The decoder and the encoder have been trained together with an environmental filter. The environmental filter combined encoded training data generated by the encoder in training with a plurality of randomized images to generate training signature data to be decoded by the decoder in training.

In a method in accordance with some embodiments, a neural network encoder, a neural network decoder, and an environmental filter are trained together. In the training, the encoder generates a plurality of sets of encoded training data corresponding to a plurality of sets of input training data, the environmental filter combines randomized images in a non-visual domain with the plurality of sets of encoded training data to generate a plurality of sets of training signature data, and the decoder decodes the plurality of sets of training signature data to generate a plurality of sets of decoded training data. The encoder and the decoder are optimized based on the plurality of sets of input training data, the randomized images, and the plurality of sets of decoded training data.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A system, comprising at least one processor configured as:
   a neural network encoder configured to generate encoded data from input data;
   an environmental filter communicably connected with an output of the encoder to receive the encoded data, and configured to combine the received encoded data with at least one randomized image to generate signature data corresponding to the input data; and
a neural network decoder connected with an output of the environmental filter to receive the signature data,
wherein a connection of the encoder to the environmental filter and then to the decoder creates a neural network in which the decoder is configured to be trained together with the encoder and the environmental filter to decode the received signature data to generate decoded data corresponding to the input data, and
wherein the at least one randomized image includes non-visual domain data representing at least one real-world condition under which the encoded data is to be captured before decoding.

2. The system of claim 1, wherein
the non-visual domain data include at least one of near infrared (NIR) noises, far infrared (FIR) noises, Light Detection And Ranging (LIDAR) noises, radar noises, or radio frequency (RF) noises.

3. The system of claim 1, wherein
the environmental filter is further configured to apply at least one randomized image transformation to the encoded data.

4. The system of claim 3, wherein
the at least one randomized image transformation includes at least one of distortion, skew, rescaling, rebalance, normalization, or equalization.

5. The system of claim 1, wherein
the neural network comprises a plurality of nodes, and
the environmental filter is configured as at least one node, among the plurality of nodes, between the encoder and the decoder.

6. A system, comprising:
a sensor on a vehicle configured to move along a guideway, the sensor configured to capture encoded data embedded in a marker installed along the guideway;
a trained neural network decoder on the vehicle, the decoder configured to decode the encoded data captured by the sensor to generate decoded data corresponding to input data encoded into the encoded data by a trained neural network encoder; and
a controller on the vehicle, the controller configured to control the vehicle based on the decoded data,
wherein the decoder and the encoder have been trained, in a neural network, together with an environmental filter which combined encoded training data generated by the encoder in training with at least one randomized image to generate training signature data to be decoded by the decoder in training,
wherein, in training, the environmental filter is connected with an output of the encoder, the decoder is connected with an output of the environmental filter, and a connection of the encoder to the environmental filter and then to the decoder creates the neural network, and
wherein the at least one randomized image includes non-visual domain data representing at least one real-world condition under which the encoded data is to be captured by the sensor before being decoded by the decoder.

7. The system of claim 6, wherein
the sensor includes at least one of a near infrared (NIR) camera, a far infrared (FIR) camera, a Light Detection And Ranging (LIDAR) scanner, a radar scanner, or a radio frequency (RF) transceiver.

8. The system of claim 6, further comprising the encoder configured to be trained online with the decoder, wherein the encoder is configured to encode input training data into encoded training data to be embedded in a marker and captured by the sensor,
the decoder is configured to decode the encoded training data captured by the sensor to generate decoded training data, and
the encoder and the decoder are configured to be fine-tuned based on the input training data and the decoded training data.

9. The system of claim 6, further comprising:
the marker which is a variable marker in which the embedded encoded data is electrically variable.

10. The system of claim 9, further comprising:
a wayside controller communicably connected with the variable marker,
wherein the wayside controller comprises the encoder configured to
generate encoded updated data in response to updated data intended for the vehicle and received at the wayside controller, and
communicate the encoded updated data to the variable marker to embed the encoded updated data therein.

11. The system of claim 6, further comprising:
the marker which is a static marker having the encoded data permanently embedded therein.

12. A method, comprising:
training a neural network encoder, a neural network decoder, and an environmental filter together in a neural network, wherein the environmental filter is connected with an output of the encoder, the decoder is connected with an output of the environmental filter, and a connection of the encoder to the environmental filter and then to the decoder creates the neural network, said training comprising:
generating, by the encoder, a plurality of sets of encoded training data corresponding to a plurality of sets of input training data,
combining, by the environmental filter, randomized images in a non-visual domain with the plurality of sets of encoded training data to generate a plurality of sets of training signature data, wherein the randomized images in the non-visual domain represent a real-world condition under which encoded data generated by the encoder is to be captured before being decoded by the decoder,
decoding, by the decoder, the plurality of sets of training signature data to generate a plurality of sets of decoded training data, and
optimizing the encoder and the decoder based on the plurality of sets of input training data, the randomized images, and the plurality of sets of decoded training data.

13. The method of claim 12, further comprising, after said training which is offline training,
online training the offline-trained encoder and the offline-trained decoder together, said online training comprising:
deploying the offline-trained decoder on a vehicle;
capturing, by a sensor on the vehicle and in real world conditions, further encoded training data embedded in a marker along a route of the vehicle, the further encoded training data generated by the offline-trained encoder from further input training data;
decoding, by the offline-trained decoder, the further encoded training data to generate further decoded training data; and fine-tuning the offline-trained encoder and the offline-trained decoder based on the further input training data and the further decoded training data.

14. The method of claim 13, wherein
the sensor is configured to capture data in the non-visual domain.

15. The method of claim 12, further comprising:
deploying the trained decoder on a vehicle;
capturing, by a sensor on the vehicle, the encoded data embedded in a marker along a route of the vehicle, the encoded data generated by the trained encoder from input data;
decoding, by the trained decoder, the encoded data captured by the sensor to generate decoded data corresponding to the input data; and
controlling the vehicle based on the decoded data.

16. The method of claim 15, further comprising:
embedding the encoded data into the marker in an electrically changeable manner.

17. The method of claim 16, further comprising:
in response to updated data intended for the vehicle, generating, by the trained encoder, encoded updated data from the updated data;
communicating the encoded updated data to the marker to electrically embed the encoded updated data therein;
capturing, by the sensor on the vehicle, the encoded updated data electrically embedded in the marker;
decoding, by the trained decoder, the encoded updated data captured by the sensor to generate decoded updated data corresponding to the updated data; and
controlling the vehicle based on the decoded updated data.

18. The method of claim 15, further comprising:
permanently embedding the encoded data into the marker.

19. The method of claim 15, wherein
the input data includes input information for controlling the vehicle, and an integrity signature of the input information, and
the decoded data includes decoded information corresponding to the input information, and a decoded integrity signature corresponding to the integrity signature of the input information,
the method further comprising verifying data integrity based on the decoded integrity signature and an integrity signature calculated from the decoded information.

20. The method of claim 13, wherein
said offline training comprises error back-propagation through the decoder, then through the environmental filter, then through the encoder, and
said online training comprises:
error back-propagation through the decoder, without error back-propagation through the environmental filter, and
reinforcement learning at the encoder.

\* \* \* \* \*